Feb. 20, 1934.  C. B. ORR  1,948,311

VEHICLE TIRE

Filed Dec. 14, 1931

INVENTOR
Clifford B. Orr
BY
Evans + McCoy
ATTORNEYS.

Patented Feb. 20, 1934

1,948,311

UNITED STATES PATENT OFFICE 1,948,311

VEHICLE TIRE

Clifford B. Orr, Akron, Ohio, assignor to The General Tire & Rubber Company, Akron, Ohio, a corporation of Ohio Application December 14, 1931
Serial No. 580,938

5 Claims. (Cl. 154—14)

This invention relates to vehicle tires, and more particularly to vehicle tires having a new and improved tread portion, and to the method of making the same.

It is well recognized that conventional vehicle tires of the pneumatic or cushion type are subject to abrasive wear, and yet, while the frictional properties thereof are great under most circumstances, such tires are apt to easily skid or slip when in contact with wet surfaces. This is explained by the fact that water will not wet rubber or actually contact therewith. Many efforts have been made to obviate this disadvantage of the use of rubber in the tread portion while retaining its advantages. Many attempts have been made to provide a tire which is less apt to skid by employing peculiarly shaped tread designs, but such constructions have not been as successful as desired. Many types of tread designs, while having a tendency to decrease skidding, create objectionable noises while in operation by reason of the fact that vacuum areas are provided in the tread.

It is therefore one of the objects of the present invention to provide a vehicle tire with a tread portion of such new and improved construction that the life of the tread will be increased and that there will be less likelihood of skidding on wet pavements.

Another object is to provide a vehicle tire with a tread face having the combined advantages of a rubber tread and one having a better coefficient of friction for wet and slippery surfaces.

Another object is to provide a vehicle tire with a tread portion having circumferentially arranged strips of fabric material vulcanized therein and exposed for contact with road surfaces.

A further object is to provide a vehicle tire with a rubber tread surface embodying circumferential cord fabric material arranged therein, the ends of the cord material being exposed for contact with a road surface.

Another object is to provide a new and improved method of applying continuous friction inserts to the tread of a vehicle tire.

With the above and other objects in view which will be apparent from the following detailed description, the present invention consists in certain features of construction and combinations of parts which will be readily understood by those skilled in the art to which the invention appertains.

In the drawing, which illustrates a suitable embodiment of the invention,

In the present invention a new type of tread face is provided in which the advantages of a rubber tread and a tread having frictional properties better than rubber with respect to wet road surfaces are combined. Broadly stated, the tire tread of the present invention is provided with a plurality of friction insert areas circumferentially arranged and vulcanized in the tread portion. These insert areas comprise a number of strips formed of cord fabric, such as the type used in the manufacture of cord tires, which are disposed in the tread in such manner that the individual cords are arranged in a generally radial position with respect to the tread with the ends of the individual cords grouped together and exposed for road contact with the rubber of the tread.

Figure 1:
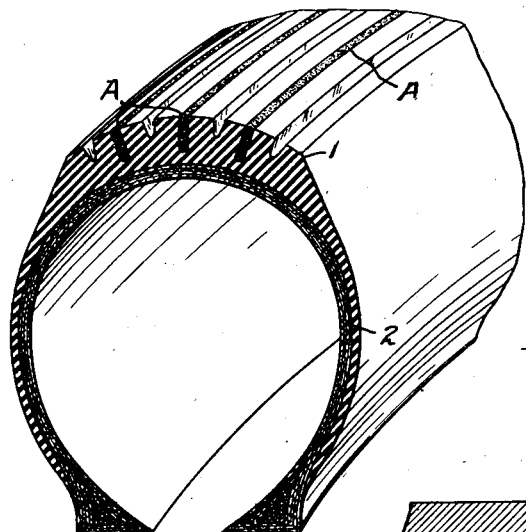
Figure 1 is a sectional perspective view of a pneumatic tire casing showing a plurality of circumferentially arranged fabric strips embodied in the tread surface thereof.

Referring to the accompanying drawing, in which like numerals refer to like parts throughout the several views, any desired number of inserts A are embedded circumferentially in spaced relation in the tread 1 of the tire casing 2, as shown in Fig. 1. Each insert A comprises, as shown in Fig. 3, a number of strip elements 3, each strip 3 being cut on a bias from a sheet of rubberized cord fabric, such as that used in building conventional cord tires, so that the individual cords are disposed at an angle to the longitudinal direction of the strip.

Figure 2:
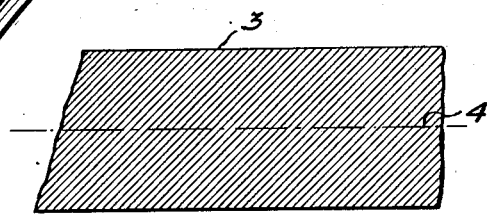
Fig. 2 is a fragmentary plan view of one of the cord fabric strips showing the bias arrangement of the cords and showing the central folding line of the strip.

The bias strips 3 are each folded along their longitudinal axes, as represented by the dotted line 4 of Fig. 2, which causes the individual cords in one flap portion of the folded strip to extend in a direction crosswise of the individual cords of the other flap portion.

Figure 3:
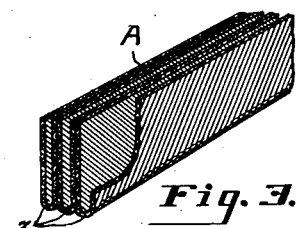
Fig. 3 is a fragmentary perspective view of a number of folded fabric strips which comprise one of the inserts for the tire.
Figure 4:
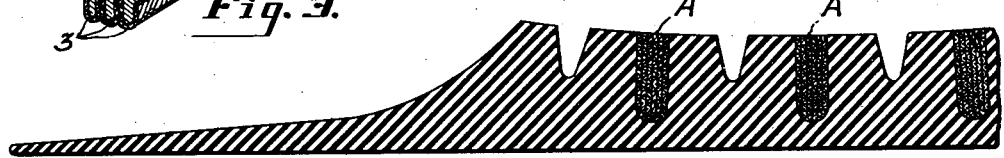
Fig. 4 is an enlarged section of the tire treadstock showing the fabric strips embodied therein.

In order to give substantial width to the insert A, a number of the folded strips 3 of rubberized cord fabric are disposed side by side, as shown in Fig. 3, and mounted in spaced grooves 5 previously provided in the tread surfaces 1 of the tire 2.

Figure 5:
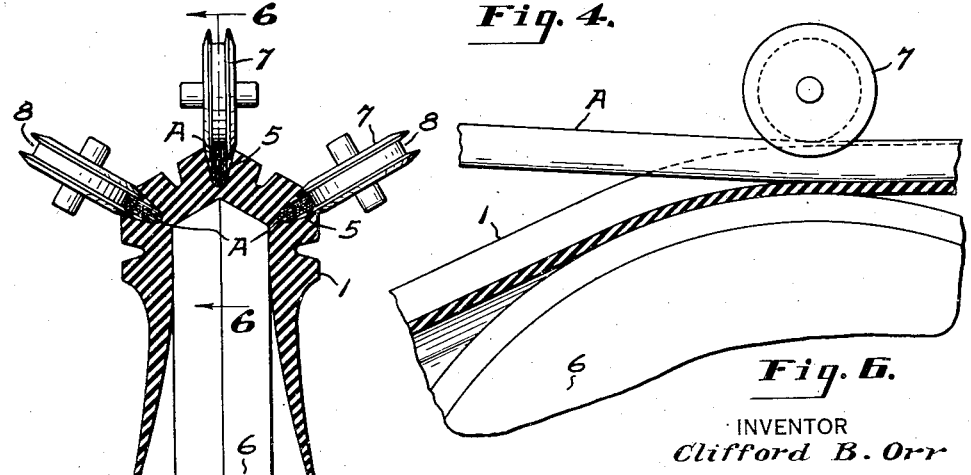
Fig. 5 is a sectional view of a mandrel showing the method of assembling the fabric strips to the tread-stock.
Figure 6:
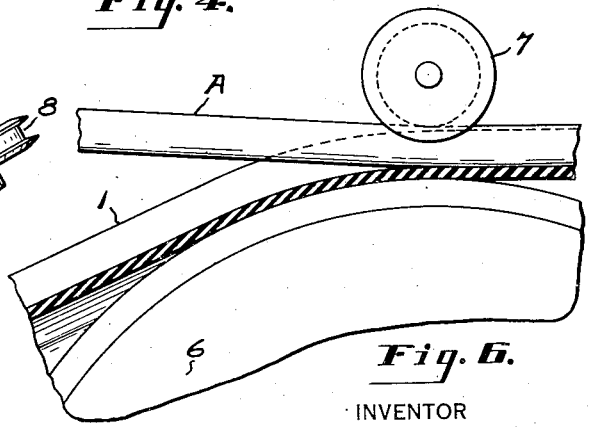
Fig. 6 is a section taken substantially on the line 6—6 of Fig. 5.

One method of assembly that may be used is to form the grooves 5 in the tread 1 during the operation of extruding the tread stock, when the tread stock is formed by the extrusion process. The tread stock either after or during the discharge from the extruding machine may be passed over a suitable rotating mandrel 6, as shown in section in Fig. 5, which cooperates with a series of rolls 7 in such manner as to open up the grooves 5 to such an extent that an insert of assembled strip elements may be positioned therein so that, when the tread-stock leaves the mandrel the side walls of each groove 5 close in toward the insert and thereby clamp the insert in position. As shown in Figs. 5 and 6, the rolls 7 are angularly arranged with respect to each other and disposed to extend into the groove 5 and separate the side walls. These rolls 7 are disposed directly over the mandrel 6 and are formed with circumferential channels 8, so that as the rolls spread the tread-stock grooves 5 the inserts are contained within the roll channels 8 and forced into the tread-stock grooves, 5.

The tread-stock may then be assembled to the tire carcass in the conventional manner, and during subsequent vulcanization of the tire casing the cord fabric inserts which are rubberized as previously explained become securely vulcanized in the tread and form an integral part thereof with the individual cords arranged in a generally radial position with their ends terminating at the tread surface.

In the completed tire casing the inserts A are well embedded in the tread stock with one or more continuous circumferential areas of cord ends exposed flush with the cord surface. Furthermore, the individual cords are securely held with the tread and by reason of the generally radial arrangement of the cords there are no cords or fabric lying with their length in the tread of the tire, and there is therefore no danger of breaking down the fabric.

By reason of the presentation of the cord ends and their individual strands to the pavement during operation of the tire, the wear of the tread is greatly reduced and the life thereof consequently lengthened, since the cord strands present greater resistance to wear when friction is applied across their ends than when it is applied longitudinally of the strands. Furthermore, the circumferential areas of cord material tend toward the material reduction of the skidding tendency and toward the increase of traction when used on wet surfaces, since the areas of cord material tend to become wetted without a substantial decrease in their tractive tendency, as in full rubber treads.

Another advantage to be derived from the use of the present invention is that in an indirect manner tire noises frequently occasioned by peculiarly shaped tread designs to partially reduce skidding are materially reduced, since in the present invention skidding tendencies are materially reduced without the use of vacuum type tread designs. The subject matter of the present invention is equally as adaptable to cushion type tires as to penumatic tires, and furthermore, various combinations of cord inserts may be employed as long as the inserts are disposed in the tread surface in a continuous manner with the individual cords arranged in a generally radial direction and having their ends exposed in the tread surfaces for contact with road surfaces.

Furthermore, it is to be understood that the particular forms of apparatus shown and described, and the particular procedure set forth, are presented for purposes of explanation and illustration, and that various modifications of said apparatus and procedure can be made without departing from my invention as defined in the appended claims.

What I claim is:

1. The method of assembling circumferential friction inserts to a tire tread having spaced circumferential grooves therein, which consists in passing a tire tread over a mandrel to widen said grooves and then feeding the inserts into said widened grooves, whereby, upon the tread leaving said mandrel the grooved side walls will grip the friction inserts.

2. The method of assembling circumferential friction inserts to a tire tread having spaced circumferential grooves therein, which consists in passing a tire tread over a rotating mandrel to widen said grooves, and holding the side walls of said grooves in spaced relation while said inserts are guided into said grooves, whereby, upon the tread leaving said mandrel, the inserts will be snugly confined between the side walls of said grooves.

3. The method of assembling circumferential friction inserts to a tire tread having spaced circumferential grooves therein, which consists in transversely distorting the tread to open up and widen the groove thereof, maintaining said tread in distorted condition and feeding the friction inserts into the widened grooves and then allowing said tread to assume its original shape whereby to clamp the friction inserts between the walls of said grooves.

4. The method of assembling circumferential friction inserts to a tire tread having spaced circumferential grooves therein, which consists in progressively transversely distorting the tread from one end to the other to progressively open up and widen said grooves and simultaneously feeding the friction inserts into the widened grooves whereby when said tread assumes its normal position the walls of said grooves clamp the friction inserts in position.

5. The method of forming a tire casing having endless friction inserts in the tread thereof, which consists in forming a tire carcass, forming a tread material with spaced grooves extending from end to end, widening said grooves and feeding strips of rubberized friction material into said grooves, applying said tread material to said carcass, and then vulcanizing said assembled casing, whereby said tread will be vulcanized to said carcass and said rubberized inserts will be firmly banded with said tread.

CLIFFORD B. ORR.